US005508838A

United States Patent [19]

Shimizu et al.

[11] Patent Number: 5,508,838

[45] Date of Patent: Apr. 16, 1996

[54] SLIT SYSTEM

[75] Inventors: Masao Shimizu, Tokyo; Kenji Ishikawa, Saitama, both of Japan

[73] Assignee: Jeol Ltd., Tokyo, Japan

[21] Appl. No.: 292,735

[22] Filed: Aug. 18, 1994

[30] Foreign Application Priority Data

Aug. 18, 1993 [JP] Japan .................................... 5-204150

[51] Int. Cl.[6] ...................................................... G02B 26/02

[52] U.S. Cl. .......................... 359/232; 359/230; 310/328; 310/331

[58] Field of Search ..................................... 359/227, 230, 359/232, 234, 236, 233; 310/311, 314, 328, 331; 356/345, 346; 354/250, 254, 234.1, 457

[56] References Cited

U.S. PATENT DOCUMENTS 4,612,440 9/1986 Brunnee et al. ........................ 250/281

*Primary Examiner*—James Phan
*Attorney, Agent, or Firm*—Webb Ziesenheim Bruening Logsdon Orkin & Hanson

[57] ABSTRACT

A small-sized, simple, high-resolution slit system adapted for use in a mass spectrometer. The slit system forms a slit whose width can be electrically controlled. The slit system comprises two displacement-enlarging mechanisms disposed in rotation symmetry. Each displacement-enlarging mechanism comprises two levers disposed in series. Each displacement-enlarging mechanism is formed by one flange provided with a groove extending therethrough. A piezoelectric device which expands and contracts along one axis is mounted to the input end of each displacement-enlarging mechanism. A blade is mounted to the output end of each displacement-enlarging mechanism. Both blades together form the slit which can be opened and closed.

8 Claims, 2 Drawing Sheets

SLIT SYSTEM

FIELD OF THE INVENTION

The present invention relates to a slit system adapted for use within a mass spectrometer or the like and, more particularly, to a small-sized, high-resolution slit system which is simple in structure and provides a slit whose width and position can be electrically adjusted.

BACKGROUND OF THE INVENTION

A slit system used as a collector slit in a magnetic-sector mass spectrometer is required to adjust the slit width at an accuracy on the order of micrometers (microns). A slit system of this kind which has been heretofore used in a magnetic-sector mass spectrometer is designed, for example, to use a differential gear, drive mechanism. The drive mechanism accurately moves a pair of slit blades. The slit is adjusted either by manually rotating a driving shaft or by a stepping motor coupled to the driving shaft. Thus, the slit width is adjusted.

Another known slit system employs bimorph piezoelectric devices. (A bimorph piezoelectric cell comprises two piezoelectric plates cemented together in such a way that an applied voltage causes one to expand and the other to contract.) Blades forming a slit are mounted to the front ends of these piezoelectric devices. The blades are directly moved to adjust the slit width.

The slit system using the differential gear is bulky and thus a small-sized mass spectrometer does not have sufficient space to accommodate such a large slit system. Furthermore, this system is complex in structure and made up of a large number of components. Hence, this system is expensive.

The slit system using the bimorph piezoelectric devices does not permit the slit to move a great distance. Therefore, it is difficult to control the slit over a wide range.

SUMMARY OF THE INVENTION

It is an object of the present invention to provide a small-sized, high-resolution slit system which is simple in structure and has a slit width capable of being adjusted over a wide range and of being electrically controlled.

The above object is achieved in accordance with the teachings of the invention by a slit system comprising: a first holder centrally provided with a hole for passing a light beam; a pair of blades arranged so as to be capable of closing said hole; a pair of displacement-enlarging mechanisms, each displacement-enlarging mechanism consisting of plural levers connected in series, each displacement-enlarging mechanism having a load application point at which a load is applied, each displacement-enlarging mechanism further having a load-acting point from which a load is applied, said blades being mounted near the load-acting points in said displacement-enlarging mechanisms, respectively; a pair of separated piezoelectric devices each expanding and contracting along one axis, each of said piezoelectric devices being mounted between said first holder and their respective load application points in said displacement-enlarging mechanisms; and a slit which is opened and closed by displacing said blades within a plane perpendicular to said light beam via said piezoelectric devices and via said displacement-enlarging mechanisms.

The novel slit system constructed as described above is characterized in that it is made up of a much fewer number of components than the prior art slit system. Also, it is easy to assemble the slit system. Furthermore, it can be assembled with reduced error. In addition, the slit system is made compact. Moreover, it is easy to control the slit width. Additionally, a mechanism which is manually rotated is dispensed with and the adjustment can be made electrically.

BRIEF DESCRIPTION OF THE DRAWINGS

Other objects and features of the invention will appear in the course of the description thereof which follows with reference to the drawings in which.

DETAILED DESCRIPTION OF THE INVENTION

Figure 1A:
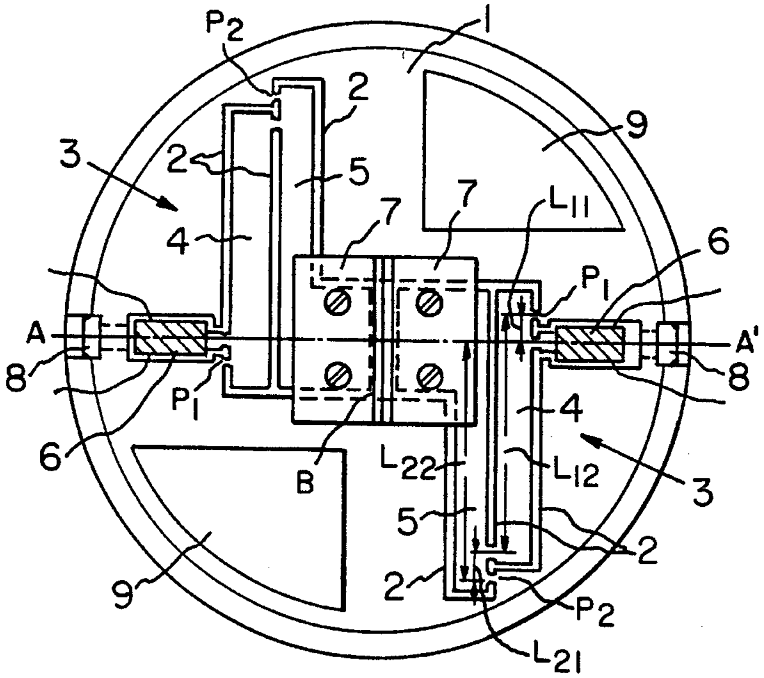
FIG. 1*a* is a front elevation of a slit system according to the present invention.
Figure 1B:
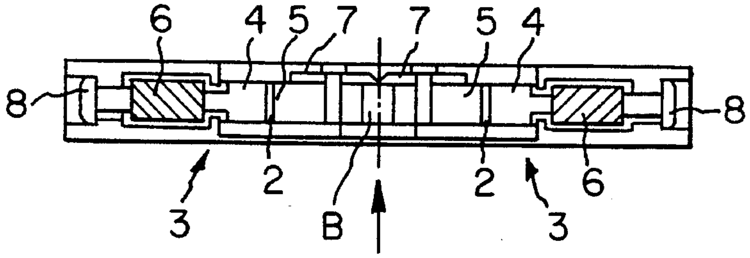
FIG. 1*b* is a cross-sectional view of the slit system shown in FIG. 1*a;*

Referring to FIGS. 1*a* and 1*b*, there is shown a slit system using lamination-type piezoelectric devices, or unimorph piezoelectric devices, each of which expands and contracts along one axis when a voltage is applied. FIG. 1*a* is a front elevation of this slit system. FIG. 1*b* is a cross-sectional view taken on line A—A' of FIG. 1*a*. Piezoelectric devices are classified into unimorph type (or lamination type) and bimorph type. The unimorph type produces a great force but results in only a small amount of displacement. This embodiment uses piezoelectric devices of the unimorph type.

Referring still to FIGS. 1*a* and 1*b*, a holder 1 in the form of a disk is made of a plate of metal such as phosphor bronze. The holder 1 is provided with a hole B for passing a beam. The holder 1 is further provided with holes 9 near the outer periphery for ventilation. Grooves 2 extend through the holder 1 and are shaped as shown. The grooves 2 are formed by wire cutting, for example. The grooves 2 are arranged symmetrically with respect to the hole B and form their respective displacement-enlarging mechanisms 3 in the holder 1. These displacement-enlarging mechanisms 3 are also arranged in rotation symmetry in the holder 1.

Each displacement-enlarging mechanism 3 consists of two levers, 4 and 5, connected in series. The first lever 4 is connected to the holder 1 at a fulcrum $P_1$. The second lever 5 is connected to the holder 1 at another fulcrum $P_2$. Each unimorph piezoelectric device 6 is connected at one end to the holder 1 with a screw 8. The lever 4 is connected to the other end of the piezoelectric device 6 at a load application point which is spaced a distance $L_{11}$ from the fulcrum $P_1$. The other end of the lever 4 is connected with the lever 5 at a load-acting point which is spaced a distance $L_{12}$ from the fulcrum $P_1$, the distance $L_{12}$ being greater than the distance $L_{11}$. The lever 4 is connected to the lever 5 at a load application point in the second lever, the load application point being spaced a distance $L_{21}$ from the fulcrum $P_2$ of the second lever 5. The front end of the lever 5 is spaced a distance $L_{22}$ from the fulcrum $P_2$ of the lever 5, the distance $L_{22}$ being larger than the distance $L_{21}$. One blade 7 of the slit system is mounted to this front end of the lever 5 which is a load-acting point in the lever 5. The levers 4 and 5 are isolated from other components by the grooves 2 except that the levers 4 and 5 are connected as described above.

In the above-described structure, when the slit system is so operated that both unimorph piezoelectric devices 6 elongate by length l, the load application point in the lever 4 moves a distance equal to the length l. As a result, the lever 4 rotates about the fulcrum $P_1$. At this time, because of the principle of levers, the load-acting point in the lever 4, or the load application point in the lever 5, moves a distance given by $l\times(L_{12}/L_{11})$. The displacement of the load application point in the lever 5 is similarly further enlarged by the lever 5. As a result, the blades 7 move a distance of $l\times(L_{12}/L_{11})\times(L_{22}/L_{21})$ toward each other. Assuming that the factor of enlargement achieved by each lever is about 6 ($L_{12}/L_{11}=L_{22}/L_{21}=6$), the distance traveled by one blade 7 is about 36 times as large as the elongation l of the piezoelectric device. Therefore, if it is assumed that the elongation of each unimorph piezoelectric device 6 is about 6 μm, then one blade moves 6 μm×36= approximately 216 μm.

Figure 2A:
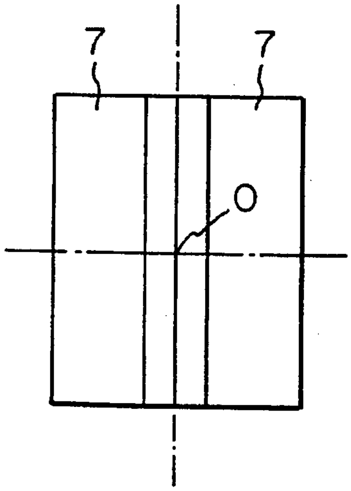
FIGS. 2*a* and 2*b* are diagrams illustrating rotation caused by movement of the blades shown in FIGS. 1*a* and 1*b;*
Figure 2B:
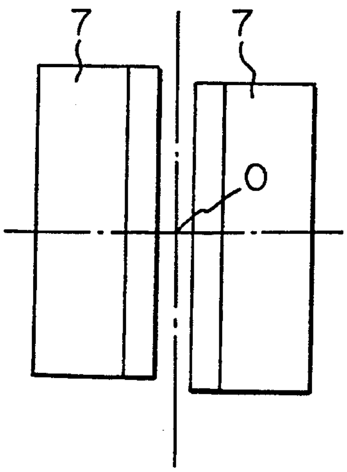

Strictly speaking, movement of each blade 7 is a circular motion about the pivot of the lever 5. The two blades making a pair rotate in opposite directions. Therefore, if the spacing varies, these two blades are maintained parallel to each other, as shown in FIGS. 2*a* and 2*b*, where indicated by 0 is the center of the hole for passing the beam. FIG. 2*a* shows a situation in which the blades are spaced closely. FIG. 2*b* shows a situation in which the blades are spaced widely. It can be seen from these figures that these two blades are maintained in rotation symmetry about the center of the hole for passing the beam.

When the distance traveled by both blades 7 is taken into account, it can be seen that the slit system shown in FIGS. 1*a* and 1*b* can adjust the spacing between the blades, or the slit width, over a range from 0 to approximately 400 μm. To cause the unimorph piezoelectric devices 6 to expand and contract by approximately 6 μm, the DC voltage applied to the piezoelectric devices should be adjusted within a range from 0 to about 150 volts.

The center of the slit about which the slit can be opened and closed and the slit spacing can be adjusted by making the elongations of the piezoelectric devices 6 different.

Figure 3B:
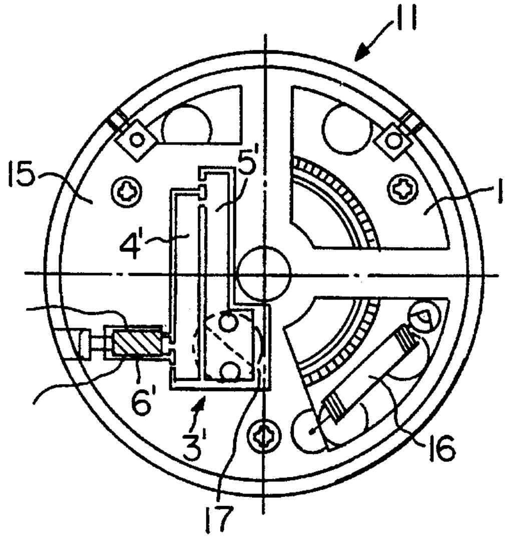
FIGS. 3*b* and 3*c* are front elevations of the slit system shown in FIG. 3*a*.
Figure 3A:
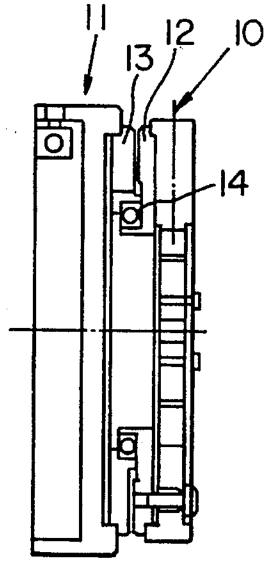
FIG. 3*a* is a cross-sectional view of another slit system according to the invention.
Figure 3C:
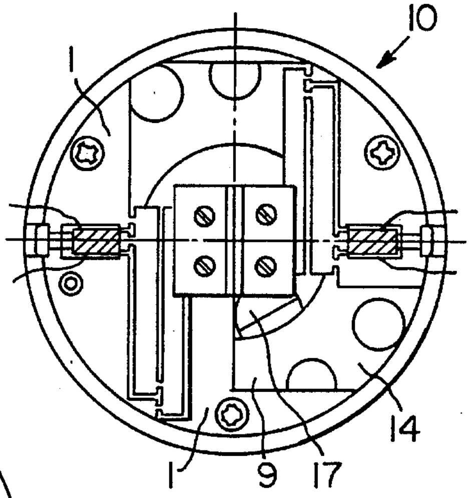

As can be seen from FIGS. 2*a* and 2*b*, the blades 7 make a rotary motion when the slit is opened and closed. At this time, the blades 7 are maintained parallel but their orientations are varied. If the slit width is made relatively large before use, or if the radius of rotation is made sufficiently large compared with the distance traveled, then the rotary motion of the blades can be neglected. However, if the used slit width is approximately 10 μm, it is necessary to correct the orientations varied by the rotary motion of the blades. FIGS. 3*a*, 3*b* and 3*c* show an example in which the whole slit system shown in FIGS. 1*a* and 1*b* is rotated to enable the correction described above.

FIG. 3*a* is a cross-sectional view of the slit system containing the central axis of the beam. FIG. 3*b* is a front elevation of the slit system as viewed from the left side of FIG. 3*a*, i.e., in the direction in which the beam enters. FIG. 3*c* is a front elevation of the slit system as viewed from the right side of FIG. 3*a*, i.e., as viewed from the beam exit side. The whole slit system is generally indicated by reference numeral 10. The details of the slit system are shown in FIGS. 1*a* and 1*b*. A second holder 11 is used to mount the slit system 10 to a mass spectrometer or other apparatus. The slit system 10 and the second holder 11 have rings 12 and 13, respectively. The rings 12 and 13 are fitted together via a radial bearing 14 so that they can rotate relative to each other. Therefore, the slit system 10 can rotate about the central axis of the second holder 11. A tension spring 16 is stretched between the second holder 11 and the holder 1 of the slit system 10. If it is assumed that the second holder 11 is fixed, the spring 16 applies a force to the slit system 10 so as to rotate it in a clockwise direction.

The second holder 11 is equipped with a displacement-enlarging mechanism 3' similar to the displacement-enlarging mechanism 3 in the holder 1. This displacement-enlarging mechanism 3' is provided with through-holes formed by wire cutting in the same way as the displacement-enlarging mechanism 3. The displacement-enlarging mechanism 3' comprises two levers 4' and 5' which are connected in series. A unimorph piezoelectric device 6' is connected at a position spaced a relatively short distance from the fulcrum in the lever 4'. A lever 17 extends through the rings 13 and 12 to the holder 1 of the slit system 10 and is fixed at the front end of the lever 5' more remote from the fulcrum. The front end of the lever 17 engages one end of each ventilation hole 9 in the holder 1. This forms a stopper acting against the rotating force applied by the tension spring 16.

In this structure, when the voltage applied to the unimorph piezoelectric device 6' is adjusted, its displacement is augmented by the displacement-enlarging mechanism 3' and transmitted to the lever 17. The slit system 10 rotates relative to the second holder 11 in response to the applied voltage. When the slit is opened or closed by varying the voltages applied to the two piezoelectric devices 6 of the slit system 10 while maintaining the blades 7 parallel to each other as described above, the blades rotate about the center of the slit. Accordingly, if the voltage impressed on the piezoelectric device 6' is changed in response to the voltage applied to the piezoelectric devices 6, then the lever 17 rotates the holder 1. In consequence, the slit width can be adjusted while maintaining the original slit orientation.

Figure 4:
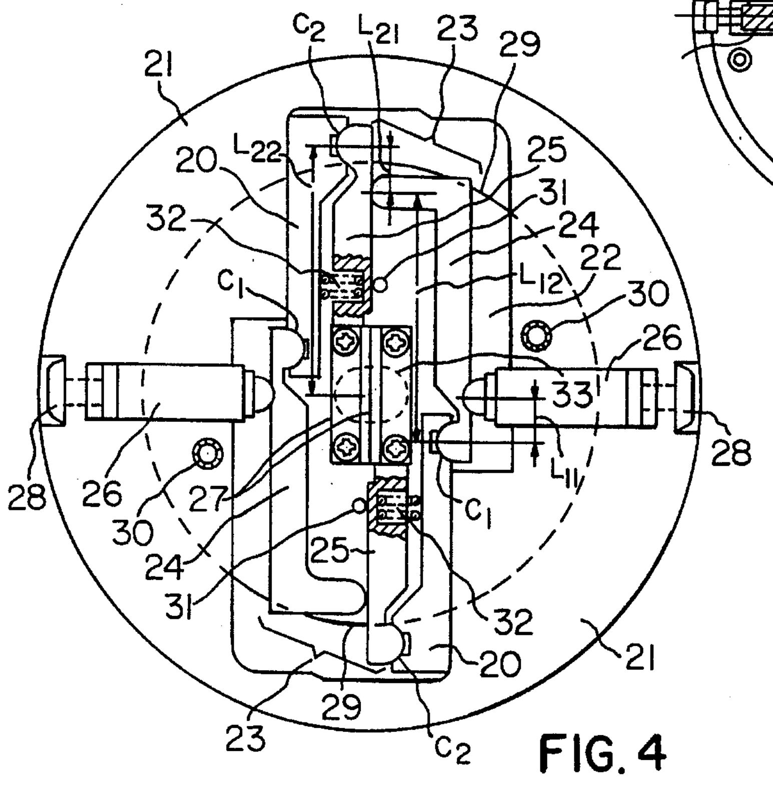
FIG. 4 is a front elevation of a further slit system according to the invention.

FIG. 4 is a plan view showing another example of the invention. In FIG. 4, a disk-like holder 21 is made of a plate of metal such as phosphor bronze. The holder 21 is centrally provided with a space 22 in which independent displacement-enlarging mechanisms 23 are accommodated. Each displacement-enlarging mechanism 23 consists of two levers 24 and 25 connected in series. The first lever 24 is held by a pivot bearing $C_1$ mounted at one end of a bearing body 20 which is affixed to the holder 21. The second lever 25 is held by a pivot bearing $C_2$ mounted at the other end of the bearing body 20. One end of each unimorph piezoelectric device 26 is mounted to the holder 21 with screws 28. The lever 24 is connected to the other end of the piezoelectric device 26 at a load application point spaced a distance $L_{11}$ from the position at which the lever 24 is held by the pivot bearing $C_1$. The other end of the lever 24 is connected to the lever 25 at a load-acting point spaced a distance $L_{12}$ from the position at which the lever 24 is held by the pivot bearing $C_1$, the distance $L_{12}$ being larger than the distance $L_{11}$.

The load-acting point in the lever 24 is connected to a load application point in the lever 25, the load application point being spaced a distance $L_{21}$ from the position at which the lever 25 is held by the pivot bearing $C_2$. One blade 27 forming a component of the slit system is mounted at the front end (the load-acting point in the lever 25) of the lever 25 spaced a distance $L_{22}$ from the position at which the lever 25 is held by the pivot bearing $C_2$, the distance $L_{22}$ being larger than the distance $L_{21}$.

In order to prevent the pair of displacement-enlarging mechanisms 23 constructed as described above from disassembling, a pair of disk-like retaining plates 29 are mounted to the holder 21 so that the holder 21 is held between the plates 29 which are respectively over and under the holder. Holes 30 are formed to pass screws for securing the retaining plates 29 to the holder 21. In FIG. 4, the top retaining plate is omitted.

Pins 31 for restricting movement of the levers 25 have been implemented in the retaining plates 29. To press the levers 25 against the pins 31, springs 32 are mounted between the bearing bodies 20 and their respective levers 25. Each retaining plate 29 is formed with a hole 33 for passing a beam.

In the condition shown in FIG. 4, the piezoelectric devices 26 have been contracted fully. Under this condition, the levers 25 bear against their respective pins, and the two blades 27 are in contact with each other. The slit width is zero.

When both unimorph piezoelectric devices 26 are operated so as to expand, the levers 24 rotate about the positions at which the levers 24 are held by the pivot bearings $C_1$. Each pivot bearing $C_1$ has two inclined surfaces which sustain a semi-cylindrical protrusion formed on each lever 24 and, therefore, the levers 24 rotate smoothly without rattling. As the levers 24 rotate, the levers rotate against the forces of the springs 32. Consequently, the blades 27 mounted to the front ends of the levers 25 move away from each other. The distance traveled by each blade is equal to (the elongation of the piezoelectric device)×(the displacement-enlargement factor of the lever 24)×(the displacement-enlargement factor of the lever 25), in the same way as in the example described previously in connections with FIG. 1.

While the novel slit system has been described in its preferred embodiments, it is to be understood that the invention is not limited thereto but may be otherwise variously embodied within the scope of the invention. For example, the number of the levers connected in series in each displacement-enlarging mechanism is not restricted to two. Three levers may be connected in series. Furthermore, the driving mechanisms for them are not restricted to unimorph piezoelectric devices. Other driving devices may also be employed.

In the embodiment described in conjunction with FIGS. 3*a*–3*c*, the whole first holder is rotated by the piezoelectric device mounted in the second holder. The means for rotating the first holder is not restricted to a piezoelectric device. For instance, a stepping motor may be used instead of the piezoelectric device. In this case, a cam may be made to bear against the holder 1 instead of the lever 17, and this cam may be rotated by the stepping motor to rotate the holder 1. In addition, the application of the novel slit system is not restricted to a mass spectrometer. Rather, the novel slit system may be applied to every kind of slit system for limiting a beam such as a light beam.

As can be seen from the description made thus far, a slit system according the present invention has two displacement-enlarging mechanisms each comprising plural levers connected in series. A piezoelectric device which expands and contracts along one axis is mounted to the input end of each displacement-enlarging mechanism. A blade is mounted to the output end of each displacement-enlarging mechanism. Both blades together form a slit which can be opened and closed. Therefore, the novel slit system is made up of a much fewer number of components than the prior art slit system. Furthermore, the novel slit system is easy to assemble and can be assembled with reduced error. In addition, the slit system can be made compact. Moreover, the slit width can be controlled with ease. Further, when the slit is opened and closed, the slit can be prevented from rotating by adding a rotary mechanism for compensating for rotation of the slit. Additionally, a mechanism which is manually rotated is dispensed with. The adjustment can be made electrically.

Having thus described our invention with the detail and particularity required by the Patent Laws, what is claimed and desired protection by Letters Patent is set forth in the following claims.

What is claimed is:

1. A slit system comprising:

a first holder centrally provided with a hole for passing a light beam;

a pair of blades arranged so as to be capable of closing up said hole;

a pair of displacement-enlarging mechanisms, each displacement-enlarging mechanism consisting of plural levers connected in series, each displacement-enlarging mechanism having a load application point at which a load is applied, each displacement-enlarging mechanism further having a load-acting point from which a load is applied, said blades being mounted near the load-acting points in said displacement-enlarging mechanisms, respectively; and a pair of piezoelectric devices each expanding and contracting along one axis, each of said piezoelectric devices being mounted between said first holder and their respective load application points in said displacement-enlarging mechanisms;

wherein a slit is opened and closed by displacing said blades within a plane perpendicular to said light beam via said piezoelectric devices and via said displacement-enlarging mechanisms.

2. The slit system of claim 1, wherein said displacement-enlarging mechanisms are arranged symmetrically with respect to said hole for passing said light beam.

3. The slit system of claim 1 or 2, wherein each of said displacement-enlarging mechanisms is formed by one flange provided with a groove extending therethrough.

4. The slit system of claim 1, wherein said first holder, said blades, said displacement-enlarging mechanisms, and said piezoelectric devices are totally held in a second holder so as to be capable of rotating about said hole for passing said light beam, and wherein there are further provided rotating means for rotating the first holder.

5. The slit system of claim 4, wherein said rotating means rotate said first holder so as to cancel changes in orientations of said slit caused by a change in spacing between said two blades.

6. The slit system of claim 4 or 5, wherein said rotating means are stepping motors.

7. The slit system of claim 4 or 5, wherein each of said rotating means comprises a resilient body positioned between said first holder and said second holder, a stopper member mounted to said second holder and engaging with said first holder to limit rotation of said first holder driven via said resilient member, and a moving means for moving said stopper member.

8. The slit system of claim 7, wherein said moving means are displacement-enlarging mechanisms each consisting of plural levers connected in series to augment elongation and shrinkage of said piezoelectric devices, said displacement-enlarging mechanisms including a displacement-enlarging mechanism having said stopper member mounted near the load-acting point in this displacement-enlarging mechanism.

* * * * *